US009036631B2

(12) United States Patent
Xue et al.

(10) Patent No.: US 9,036,631 B2
(45) Date of Patent: May 19, 2015

(54) IDENTIFYING GN/GP MODE AT PCRF

(71) Applicants: Xiong Xue, Kanata (CA); Haiqing H. Ma, Nepean (CA)

(72) Inventors: Xiong Xue, Kanata (CA); Haiqing H. Ma, Nepean (CA)

(73) Assignee: Alcatel Lucent, Boulogne-Billancourt (FR)

(*) Notice: Subject to any disclaimer, the term of this patent is extended or adjusted under 35 U.S.C. 154(b) by 360 days.

(21) Appl. No.: 13/686,665

(22) Filed: Nov. 27, 2012

(65) Prior Publication Data
US 2014/0146711 A1   May 29, 2014

(51) Int. Cl.
*H04L 12/28* (2006.01)
*H04L 12/14* (2006.01)
(52) U.S. Cl.
CPC .................................. *H04L 12/1407* (2013.01)
(58) Field of Classification Search
CPC .................................................... H04L 12/1407
USPC ................ 370/259, 389, 392; 455/432.1, 433
See application file for complete search history.

(56) References Cited

U.S. PATENT DOCUMENTS

2012/0120932 A1\* 5/2012 Liang et al. .................... 370/338
2012/0176997 A1\* 7/2012 Rydnell et al. ................. 370/329

OTHER PUBLICATIONS

Technology White paper, "Interworking LTE EPC with W-CDMA Packet Switched Mobile Cores" copyright of Alcatel-Lucent @2009.\*
3GPP TS 29.212 "3rd Generation Partnership Project; Technical Specification Group Core Network and Terminals; Policy and Charging Control Over Gx Reference Point (Release 10)", No. V10.5.0, 2011, pp. 1-132.
3GPP TS 29.213 "3rd Generation Partnership Project; Technical Specification Group Core Network and Terminals; Policy and Charging Control Signalling Flows and QoS Parameter Mapping (Release 10)", No. V10.5.0, 2012, pp. 1-141.
3GPP TS 29,214 "3rd Generation Partnership Project; Technical Specification Group Core Network and Terminals; Policy and Charging Control Over Rx Reference Point (Release 10)", No. V10.5.0, 2011, pp. 1-50.

\* cited by examiner

*Primary Examiner* — Ricky Ngo
*Assistant Examiner* — Kabir Jahangir
(74) *Attorney, Agent, or Firm* — Kramer & Amado, P.C.

(57) ABSTRACT

A method, and machine readable storage medium is disclosed for a method performed by policy and charging rules function (PCRF) node (PCRN) in a packet switching network, for identifying a Gn/Gp mode of an adjacent network node, in which the adjacent network node which is connected directly to a Serving General Packet Radio Service (GPRS) Support Node (SGSN) node via a Gn/Gp interface, from an adjacent network node connected to a Serving Gateway (S-GW) via a S5/S8 interface, wherein the adjacent network node is a Packet Data Network Gateway (P-GW) node or a Gateway GPRS Support Node (GGSN). The method comprises receiving at the PCRN from the adjacent network node, a Diameter Credit Control Request (CCR) message requesting a IP-CAN session; determining whether the request message includes a SGSN-Address and does not include an AN-GW-Address.

20 Claims, 3 Drawing Sheets

IDENTIFYING GN/GP MODE AT PCRF

FIELD OF INVENTION

Various exemplary embodiments disclosed herein relate generally to policy and charging in telecommunications networks.

BACKGROUND

The 3rd Generation Partnership Project (3GPP) has recommended a network scheme it terms "Long Term Evolution" (LTE). In an LTE network, all communications are carried over an Internet Protocol (IP) channel from user equipment (UE) to an all-IP core called the Evolved Packet Core (EPC). The EPC then provides gateway access to other networks while ensuring an acceptable Quality of Experience (QoE) and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. Note that the PCRF function is provided by a PCRF node (PCRN) and that the terms PCRF and PCRN are often used interchangeably. In this document, PCRF can refer to the node that provides this function.

When General Packet Radio Service (GPRS)-compatible access networks participate in a mobile network end-to-end connection with a PCRF node (PCRN) as a policy decision maker, multiple network topologies are possible, including a topology where a Packet Data Network (PDN) gateway (or "P-GW") is directly connected to a Serving GPRS Support Node (SGSN) via a Gn/Gp interface. This topology essentially makes the P-GW a combination node: On a downstream connection to an SGSN, the P-GW has Gn or Gp interface; on an upstream connection to the PCRN, it appears to the PCRN as an Evolved Packet System (EPS) P-GW, rather than a Gateway GPRS Support Node (GGSN).

In view of the foregoing, it would be desirable to provide a Policy and Charging Rules Node (PCRN) implementing a PCRF capable of distinguishing a P-GW combination node network topology from a traditional GGSN gateway and from a P-GW connected via a Serving gateway (S-GW) to a SGSN, in order for PCRF to be able to make appropriate policy and Policy Control and Charging (PCC) rule decisions

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) in a packet switching network. The method comprises steps of: receiving at the PCRN from an adjacent network node, a Diameter Credit Control Request (CCR) message; determining whether the request message includes a SGSN-Address; determining whether the request message does not include an AN-GW-Address; and responsive to the request message including an SGSN-Address and the request message not including an AN-GW-Address, storing within the PCRN for the duration of the associated IP-CAN session, an indication that the adjacent network node is connected directly to a Serving General Packet Radio Service (GPRS) Support Node (SGSN) node via a Gn/Gp interface; wherein said adjacent network node comprises a Packet Data Network Gateway (P-GW) node or a Gateway GPRS Support Node (GGSN).

In various alternative embodiments, responsive to the request message including an AN-GW-Address, the method further comprises a step of storing within the PCRN for the duration of the associated IP-CAN session, an indication that the P-GW is connected to a Serving Gateway (S-GW) via a S5/S8 interface.

Various alternative embodiments further comprise a step of recording at the PCRN, for the duration of the associated IP-CAN session, the AN-GW-Address and if present, the SGSN-Address.

In various alternative embodiments, the step of determining whether the request message includes a SGSN-Address comprises determining whether the request message contains an SGSN-Address AVP with a valid SGSN address.

In various alternative embodiments, the CCR message comprises a Credit Control Request type of Initial-request.

Various alternative embodiments further comprise a step of determining whether the request message contains a RAT-Type AVP containing a GPRS-compatible type, wherein the storing step is further responsive to the request message containing a RAT-Type AVP containing a GPRS-compatible type.

In various alternative embodiments, the step of determining whether the request message contains a RAT-Type AVP comprises determining whether the RAT-Type AVP contains one of the following types: GAN; GERAN; UTRAN; and HSPA_Evolution.

Various alternative embodiments further comprise a step of determining whether the request message contains an IP-CAN-Type AVP containing type EPS, wherein the storing step is further responsive to the request message containing an IP-CAN-Type AVP containing type EPS.

Various alternative embodiments further comprise a step of recording at the PCRN, for the duration of the associated IP-CAN session, the SGSN-Address and an AN-GW-Address value of "null".

In various alternative embodiments, the CCR message comprises a Credit Control Request type of Update-request and wherein responsive to the request message not including an SGSN-Address and the request message not including an AN-GW-Address, the method comprises a step of retrieving from the PCRN, a stored indication of the P-GW connection.

Various other exemplary embodiments relate to a tangible and non-transitory machine-readable storage medium encoded with instructions thereon for execution by a network element of a telecommunication network, wherein the tangible and non-transitory machine-readable storage medium comprises: instructions for receiving at the PCRN from an adjacent network node, a Diameter Credit Control Request (CCR) message; instructions for determining whether the request message includes a SGSN-Address; instructions for determining whether the request message does not include an AN-GW-Address; and instructions for, responsive to the request message including an SGSN-Address and the request message not including an AN-GW-Address, storing within the PCRN for the duration of the associated IP-CAN session, an indication that the adjacent network node is connected directly to a Serving General Packet Radio Service (GPRS) Support Node (SGSN) node via a Gn/Gp interface; wherein said adjacent network node comprises a Packet Data Network Gateway (P-GW) node or a Gateway GPRS Support Node (GGSN).

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1A:
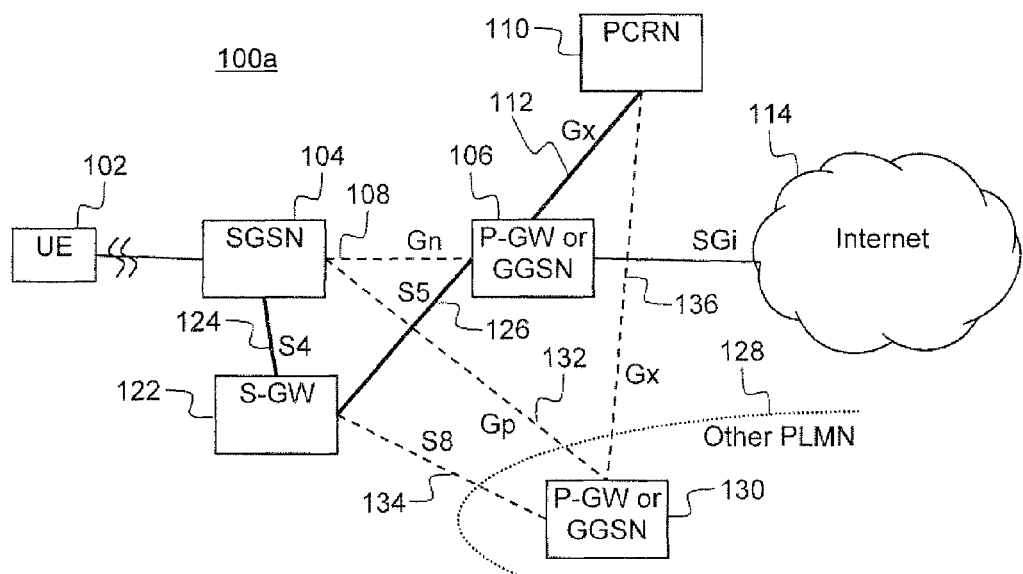
FIG. 1a illustrates a first topology of a GPRS-compatible network.

Referring now to the drawings, in which like numerals refer to like components or steps, there are disclosed broad aspects of various exemplary embodiments.

FIG. 1a illustrates a first topology of a CPRS-compatible telecommunications network 100a in a traditional LTE topology where User Equipment (UE) 102 is connected through a radio access to SGSN 104 which is connected to a S-GW node 122 via a S4 interface 124. The S-GW 122 is in communication with P-GW (or GGSN) 106 via an S5 interface 126. Note that an S8 134 interface provides a comparable function to a S5 interface and is used when the S-GW 122 is in a different PLNM 128 than the P-GW or GGSN 130 to which it is connected. These two interfaces are referred to collectively as an S5/S8 interface. P-GW (or GGSN) 106 is in communication with PCRN 110 via a Gx interface 112 and to a Packet Data Network such as the Internet 114 via an SGi interface. For the purposes of this disclosure, network topology of FIG. 1a is considered a traditional LTE topology.

Figure 1B:
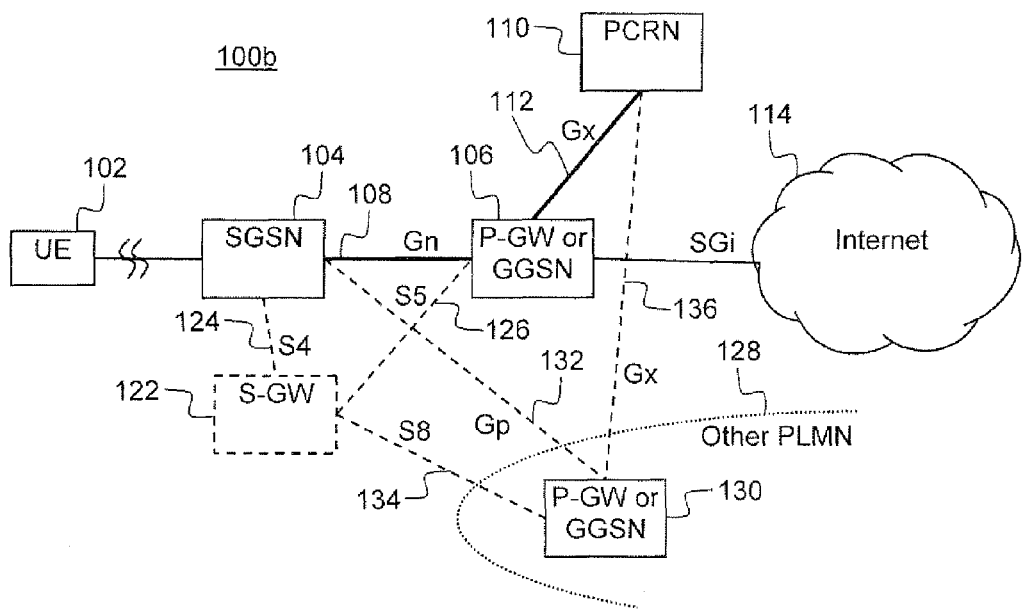
FIG. 1b illustrates a second topology of a GPRS-compatible network.

In an alternative topology of FIG. 1b, SGSN node 104 is connected directly to P-GW (or GGSN) 106 via a Gn interface 108. Note that a Gp 132 interface provides a comparable function to a Gn 108 interface and is used when the SGSN 104 is in a different PLNM 128 than the P-GW or GGSN 130 to which it is connected. These two interfaces are referred to collectively as a Gn/Gp interface.

When a GPRS-compatible access network participates in a mobile network end-to-end connection with a PCRF node (PCRN) as a policy decision maker, it is important for the PCRN to be able to identify a unique network topology where a P-GW is connected directly to a SGSN via a Gn/Gp interface, such as illustrated in FIG. 1b, in order for the PCRN to make correct policy and PCC rule decisions. In the topology of FIG. 1b the P-GW is referred to as operating in Gn/Gp mode where the P-GW assumes some of the functions of a GGSN. In this topology, the P-GW is sometimes referred to as a combination node or "combo box": On the downstream connection to the SGSN, the P-GW has a Gn or Gp interface (Gn/Gp); on the upstream connection to the PCRN, it appears to be an Evolved Packet System (EPS) P-GW, rather than a GGSN.

Specifically, it is important for the PCRN to be able to distinguish a combination node P-GW, such as illustrated in FIG. 1b, from a P-GW connected to GPRS access via a S-GW SGSN, such as illustrated in FIG. 1a and from a traditional GGSN gateway as will be discussed below, with reference to FIG. 3.

Embodiments disclosed basically use a distinguishing pattern characterized by the absence of an AN-GW-Address in combination with specific IP-CAN type, Radio Access Technology (RAT) type and SGSN-Address to identify this network topology.

Embodiments disclosed can distinguish this topology when an IP-CAN session is established or when an IP-CAN session is updated, such as for example during a mobile telephone roaming scenario, where an existing connection is handed off to a network access supporting different technologies, resulting in an end-to-end IP connection switching to a combination node P-GW with a Gn/Gp interface, as well as switching from such a combination node P-GW to a traditional P-GW connected to an SGSN node via a S5/S8 interface.

Figure 2:
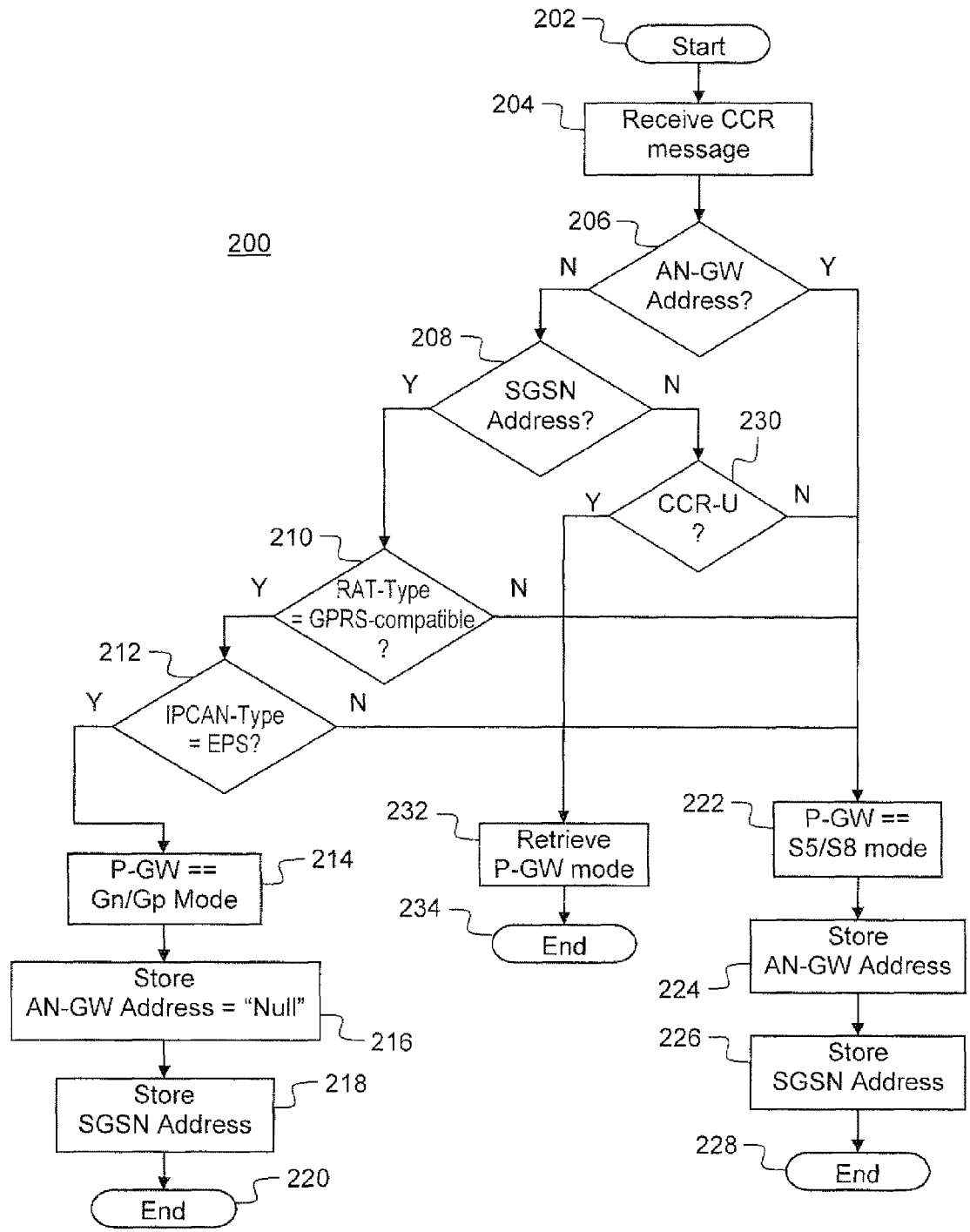
FIG. 2 illustrates a process flow diagram according to an embodiment of the invention.

FIG. 2 illustrates a process flow diagram according to an embodiment of the invention. The process of FIG. 2 takes place on PCRN 110 and starts at step 202. At step 204, PCRN 110 receives a Diameter Credit Control Request (CCR) message requesting establishment of an IP-CAN session, from P-GW (or GGSN) 106 via Gx interface 112. The CCR message can be either of type "Initial-request" (CCR-I), requesting a new IP-CAN session, or of type "Update-request" (CCR-U), requesting updating of an existing IP-CAN session.

At step 206, PCRN 110 determines whether the CCR message does not include an AN-GW-Address by determining whether the CCR message does not contain an AN-GW-Address AVP. If the CCR message does not contain an AN-GW-Address then the process proceeds to step 208.

At step 208, PCRN 110 determines whether the CCR message includes an SGSN address by determining whether the CCR message contains an SGSN-Address AVP containing a valid SGSN address. Note that an SGSN-Address could be contained in an IPv4 3GPP-SGSN-Address AVP or 3GPP-SGSN-IPv6-Address AVP or both, depending on type of IP addresses assigned to UE 102. Similarly, AN-GW-Addresses could be IPv4 or IPv6 or both. If the CCR message contains an SGSN-Address AVP then the process proceeds to step 210.

At step 210, PCRN 110 determines whether the CCR message contains a RAT-Type AVP containing a GPRS-compatible type such as: GAN; GERAN; UTRAN; and HSPA_Evolution. Other GPRS-compatible types could be defined in the future and embodiments would contemplate these enhancements also. If the CCR message contains a RAT-Type AVP with a GPRS-compatible type then the process proceeds to step 212.

At step 212, PCRN 110 determines whether the CCR message contains an IP-CAN-Type AVP containing type EPS. Additionally, other IP-CAN types which have GPRS access would be considered similarly to type EPS. If the CCR message contains an IP-CAN-Type AVP with type EPS, then the process proceeds to step 214.

At step 214, PCRN 110 determines that the P-GW (or GGSN) 106 is operating in "Gn/Gp mode" and stores within the PCRN, associated with the IP-CAN session, and for the duration of the IP-CAN session, an indication that the P-GW (or GGSN) 106 is connected directly to a SGSN node 104 via a Gn/Gp interface.

At step 216, PCRN 110 stores within the PCRN, associated with the IP-CAN session, and for the duration of IP-CAN session, an indication that there is no AN-GW address associated with the IP-CAN session by storing an AN-GW-Address value of "null".

At step 218, PCRN 110 stores within the PCRN, associated with the IP-CAN session, and for the duration of IP-CAN session, the SGSN-Address.

The information stored at steps 214, 216 and 218 would be subsequently retrieved by the PCRN when making policy decisions and PCC decision for the IP-CAN session. The process then stops at step 220.

If at step 206, PCRN 110 determines that the CCR message does include an AN-GW-Address, then the process proceeds to step 222.

At step 222, PCRN 110 determines that the P-GW (or GGSN) 106 is connected to a S-GW node via an S5/S8 interface ("S5/S8 mode") and stores within the PCRN, associated with the IP-CAN session, and for the duration of the IP-CAN session, an indication that the P-GW (or GGSN) 106 is connected to a S-GW node via an S5/S8 interface.

The information stored at steps 222, 224 and 226 would be subsequently retrieved by the PCRN when making policy decisions and PCC decision for the IP-CAN session. The process then stops at step 228.

If at step 208, PCRN 110 determines that the CCR message does not include an SGSN address (and thus the CCR message contains neither a AW-GW-Address nor a SGSN-Address), then the process proceeds to step 230 where the PCRN 110 determines if the CCR message is of type "Update-request" (CCR-U). If the CCR message is not a CCR-U message (i.e.: a CCR-I message) then the PCRN determines that the process proceeds to step 222 described previously.

At step 230, if the CCR message is a CCR-U message, then the process proceeds to step 232 where PCRN 110 retrieves from the internal records of PCRN 110, a stored indication of the P-GW connection mode, as determined when the IP-CAN session was previously initiated or previously updated. The process then ends at step 234.

If at step 210, PCRN 110 determines that the CCR message does not contain a RAT-Type AVP with a GPRS-compatible type, then process proceeds to step 222 described previously.

If at step 212, PCRN 110 determines that the CCR message does not contain an IP-CAN-Type AVP with type EPS, then process proceeds to step 222 described previously.

For illustrative purposes, the following example describes a scenario where an end-to-end IP-CAN session is initially established for a mobile device (UE) through a P-GW via Gn/Gp interface to GERAN access. The IP-CAN session is the handed over to GERAN access with the same SGSN, and finally, the mobile device moves to a location with EUTRAN access to another SGSN via an S-GW and an S4 interface.

A user powers up his mobile device in a location covered by a mobile network with GERAN Radio access type, which connected to a SGSN with a Gn/Gp interface to a P-GW. An IP-CAN session establishment request is presented to the PCRN on a Gx interface with an SGSN-Address AVP, GERAN RAT-Type, EPS IP-CAN type, APN-AMBR but without AN-GW-Address AVP.

The PCRN recognizes that the session request is from a P-GW via a Gn/Gp interface to GPRS access, records the SGSN-Address according to values in the Gx request message, among other AVPs, to the session and sets the AN-GW-Address value to "null". For this case, the APN-AMBR is interpreted as session default bearer MBR. The PCRN authorizes the GPRS default bearer based on SPR profile per QCI MBR values and operator-configurable policy and rules on the PCRN, and then sets the APN-AMBR in the session establishment response. The IP-CAN session is then established and the mobile device is ready to launch and receive IP applications.

The user then moves to a location where the radio access network is GERAN, and connected to the same SGSN as when the IP-CAN session was established. This would trigger an IP-CAN session update request with RAT type GERAN, perhaps a new pair of APN-AMBR values, but with neither a SGSN-Address nor AN-GW-Address.

The PCRN finds no SGSN-Address or AN-GW-Address from the session update request and then accesses the IP-CAN session record to retrieve the stored information and determines that the stored AN-GW-Address has a "null" value and that the session is still using the same SGSN connected to the PDN gateway with Gn/Gp. The PCRN then authorizes the APN-AMBR with default bearer MBR limit according to SPR profile per QCI MBR limit and operator-configurable policy and rules on the PCRN. The RAT type is also updated.

The user then moves to a location covered by a UTRAN access network, which connected to a new SGSN, and via an S4 interface, is connected to an S-GW, which connected to the same P-GW via an S5 or S8 interface. This would trigger another session update request, with AN-GW-Address AVP, a new RAT type UTRAN, and perhaps a new APN-AMBR, among other AVPs.

The PCRN then evaluates the new update request, recognizes that it is the same P-GW but now with an S4 interface to the downlink access. The PCRN would authorize APN-AMBR values according to SPR profile APN-AMBR values (not per QCI MBR values as in Gn/Gp case) and operator-configurable policy and rules on the PCRN. The AN-GW-Address, new RAT type UTRAN, authorized APN-AMBR, as well as a new SGSN-Address (if provided in update request), will be recorded internally against the IP-CAN session in the PCRN.

Figure 3:
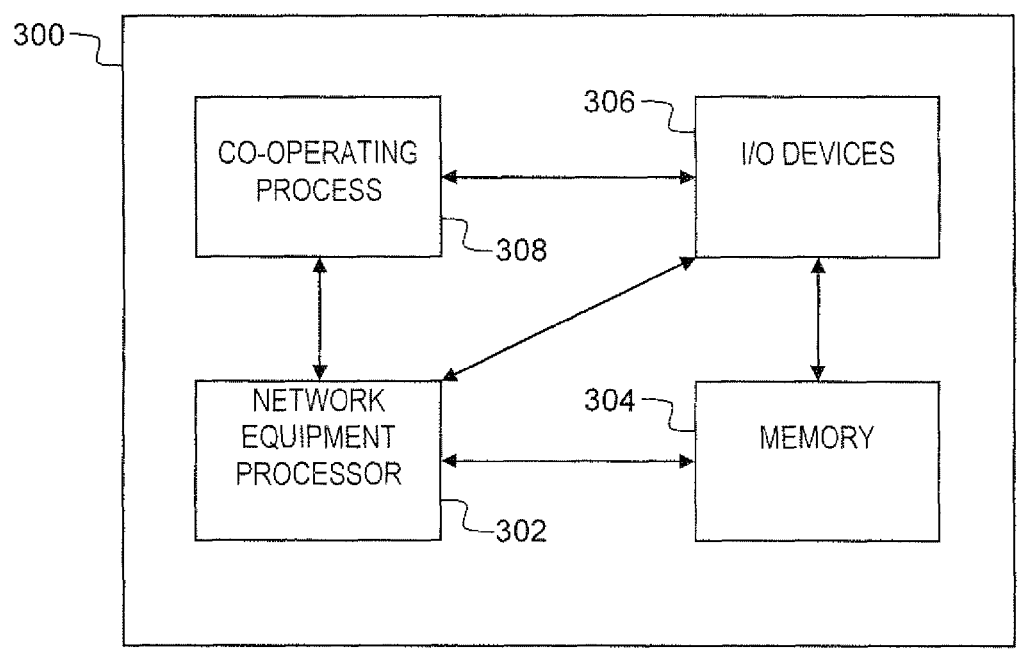
FIG. 3 illustrates an exemplary network element processor assembly according to an embodiment of the invention.

FIG. 3 depicts a high-level block diagram of a network equipment processor assembly suitable for use in performing functions described herein.

As depicted in FIG. 3, network equipment processor assembly 300 includes a network equipment processor element 302 (e.g.: a central processing unit (CPU) and/or other suitable processor(s)), a memory 304 (e.g.: random access memory (RAM), read only memory (ROM), and the like), a co-operating module/process 308, and various input/output devices 306 (e.g.: a user input device (such as a keyboard, a keypad, a mouse, and the like), a user output device (such as a display, a speaker, and the like), an input port, an output port, a receiver, a transmitter, and storage devices (e.g.: a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents, Alternatively, according to one embodiment, the cooperating process 308 can be loaded into memory 304 and executed by network equipment processor 302 to implement the functions as discussed herein. As well, co-operating process 308 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method performed by a policy and charging rules node (PCRN) in a packet switching network, the method comprising steps of:
    receiving at the PCRN from an adjacent network node, a Diameter Credit Control Request (CCR) message;
    determining whether the request message does not include an AN-GW-Address;
    determining whether the request message includes a SGSN-Address; and
    responsive to the request message including an SGSN-Address and the request message not including an AN-GW-Address, storing within the PCRN for the duration of the associated IP-CAN session, an indication that said adjacent network node is connected directly to a Serving General Packet Radio Service (GPRS) Support Node (SGSN) node via a Gn/Gp interface;
wherein said adjacent network node comprises a Packet Data Network Gateway (P-GW) node or a Gateway GPRS Support Node (GGSN).

2. The method of claim 1 wherein responsive to the request message including an AN-GW-Address, the method further comprises a step of storing within the PCRN for the duration of the associated IP-CAN session, an indication that said adjacent network node is connected to a Serving Gateway (S-GW) via an S5/S8 interface.

3. The method of claim 2 further comprising a step of recording at the PCRN, for the duration of the associated IP-CAN session, the AN-GW-Address and if present, the SGSN-Address.

4. The method of claim 1 wherein the step of determining whether the request message includes a SGSN-Address comprises determining whether the request message contains a SGSN-Address AVP with a valid SGSN address.

5. The method of claim 1 wherein the CCR message comprises a Credit Control Request type of Initial-request.

6. The method of claim 4 further comprising a step of determining whether the request message contains a RAT-Type AVP containing a GPRS-compatible type, wherein the storing step is further responsive to the request message containing a RAT-Type AVP containing a GPRS-compatible type.

7. The method of claim 6 wherein the step of determining whether the request message contains a RAT-Type AVP comprises determining whether the RAT-Type AVP contains one of the following types: GAN; GERAN; UTRAN; and HSPA_Evolution.

8. The method of claim 7, further comprising a step of determining whether the request message contains an IP-CAN-Type AVP containing type EPS, wherein the storing step is further responsive to the request message containing an IP-CAN-Type AVP containing type EPS.

9. The method of claim 8 further comprising a step of recording at the PCRN, for the duration of the associated IP-CAN session, the SGSN-Address and an AN-GW-Address value of "null".

10. The method of claim 1 wherein the CCR message comprises a Credit Control Request type of Update-request and wherein responsive to the request message not including an SGSN-Address and the request message not including an AN-GW-Address, the method comprises a step of retrieving from the PCRN, a stored indication of the P-GW connection.

11. A tangible and non-transitory machine-readable storage medium encoded with instructions thereon for execution by a network element of a telecommunication network, wherein the tangible and non-transitory machine-readable storage medium comprises:
   instructions for receiving at the PCRN an adjacent network node, a Diameter Credit Control Request (CCR) message;
   instructions for determining whether the request message does not include an AN-GW-Address;
   instructions for determining whether the request message includes a SGSN-Address; and
   instructions for, responsive to the request message including an SGSN-Address and the request message not including an AN-GW-Address, storing within the PCRN for the duration of the associated IP-CAN session, an indication that said adjacent network node is connected directly to a Serving General Packet Radio Service (GPRS) Support Node (SGSN) node via a Gn/Gp interface;
wherein said adjacent network node comprises a Packet Data Network Gateway (P-GW) node or a Gateway GPRS Support Node (GGSN).

12. The tangible and non-transitory machine-readable storage medium of claim 11, further comprising instructions for, responsive to the request message including an AN-GW-Address, storing within the PCRN for the duration of the associated IP-CAN session, an indication that said adjacent network node is connected to a Serving Gateway (S-GW) via an S5/S8 interface.

13. The tangible and non-transitory machine-readable storage medium of claim 12, further comprising instructions for, recording at the PCRN, for the duration of the associated IP-CAN session, the AN-GW-Address and if present, the SGSN-Address.

14. The tangible and non-transitory machine-readable storage medium of claim 11, wherein the instruction for determining whether the request message includes a SGSN-Address comprises determining whether the request message contains a SGSN-Address AVP with a valid SGSN address.

15. The tangible and non-transitory machine-readable storage medium of claim 11, wherein the CCR message comprises a Credit Control Request type of Initial-request.

16. The tangible and non-transitory machine-readable storage medium of claim 14, further comprising instructions for determining whether the request message contains a RAT-Type AVP containing a GPRS-compatible type, wherein the instruction for storing is further responsive to the request message containing a RAT-Type AVP containing a GPRS-compatible type.

17. The tangible and non-transitory machine-readable storage medium of claim 16, wherein the instruction for determining whether the request message contains a RAT-Type AVP comprises instructions for determining whether the RAT-Type AVP contains one of the following types: GAN; GERAN; UTRAN; and HSPA_Evolution.

18. The tangible and non-transitory machine-readable storage medium of claim 17, further comprising instructions for determining whether the request message contains an IP-CAN-Type AVP containing type EPS, wherein the instructions for storing are further responsive to the request message containing an IP-CAN-Type AVP containing type EPS.

19. The tangible and non-transitory machine-readable storage medium of claim 18, further comprising instructions for recording at the PCRN, for the duration of the associated IP-CAN session, the SGSN-Address and an AN-GW-Address value of "null".

20. The tangible and non-transitory machine-readable storage medium of claim 11, wherein the CCR message comprises a Credit Control Request type of Update-request and wherein responsive to the request message not including an SGSN-Address and the request message not including an AN-GW-Address, the storage medium comprises instructions for retrieving from the PCRN, a stored indication of the P-GW connection.

* * * * *